United States Patent [19]

Hayashi

[11] Patent Number: 4,696,261

[45] Date of Patent: Sep. 29, 1987

[54] COOLANT LEVEL SENSOR ARRANGEMENT IN BOILING LIQUID COOLING SYSTEM

[75] Inventor: Yoshimasa Hayashi, Kamakura, Japan

[73] Assignee: Nissan Motor Co., Ltd., Yokohama, Japan

[21] Appl. No.: 894,090

[22] Filed: Aug. 7, 1986

Related U.S. Application Data

[63] Continuation of Ser. No. 699,315, Feb. 7, 1985, abandoned.

[30] Foreign Application Priority Data

Feb. 21, 1984 [JP] Japan .............................. 59-23459[U]

[51] Int. Cl.⁴ .............................................. F01P 3/22
[52] U.S. Cl. .............................. 123/41.21; 123/41.44; 340/624; 73/309; 73/334
[58] Field of Search ...... 123/41.03, 41.15, 41.2–41.27, 123/41.44; 73/305, 309, 313, 334, 306; 340/623, 624

[56] References Cited

U.S. PATENT DOCUMENTS

| | | | |
|---|---|---|---|
| 1,499,708 | 7/1924 | Tuten ................................ | 123/41.03 |
| 1,687,679 | 10/1928 | Mallory ............................. | 123/41.03 |
| 1,787,562 | 1/1931 | Barlow .............................. | 123/41.03 |
| 3,371,535 | 3/1968 | Martiniak .......................... | 73/306 |
| 3,715,539 | 2/1973 | Silberg et al. ..................... | 340/263 |

Primary Examiner—William A. Cuchlinski, Jr.
Attorney, Agent, or Firm—Schwartz, Jeffery, Schwaab, Mack, Blumenthal & Evans

[57] ABSTRACT

In order to accurately detect the coolant level in the coolant jacket of a cylinder head, a separate chamber member is mounted to the cylinder head and fluidly communicated with the coolant jacket of the cylinder head in a manner to contain therein the coolant by the same level as that in the coolant jacket, and a level sensor is mounted to the chamber member to detect the level of coolant contained in the chamber member.

6 Claims, 6 Drawing Figures

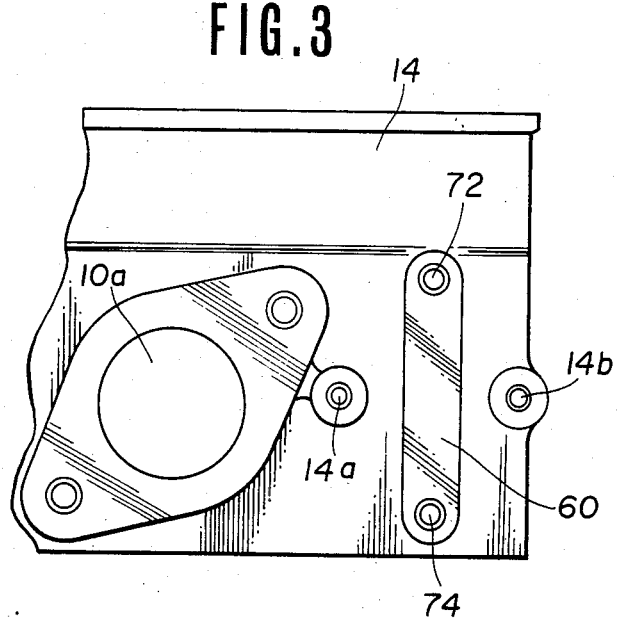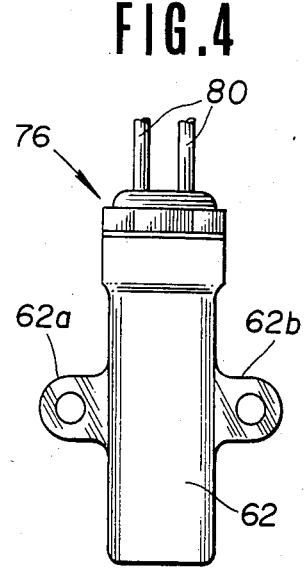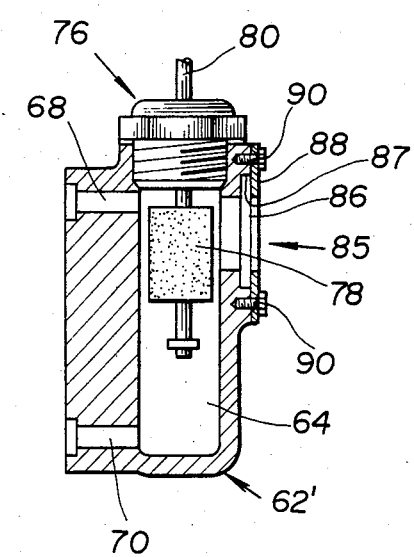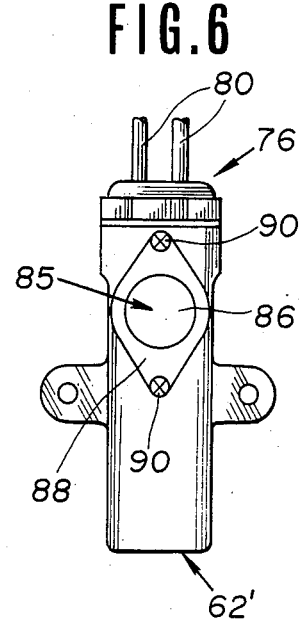

COOLANT LEVEL SENSOR ARRANGEMENT IN BOILING LIQUID COOLING SYSTEM

This application is a continuation of application Ser. No. 699,315, filed Feb. 7, 1985, now abandoned.

BACKGROUND OF THE INVENTION

1. Field of the Invention

The present invention relates in general to an engine cooling system of the type wherein the coolant is boiled, so as to make use of the latent heat of vaporization thereof, and the coolant vapor used as a vehicle for removing heat from the engine, and more particularly to an improved coolant level sensor arrangement therefor.

2. Description of the Prior Art

Hitherto, a so-called "boiling liquid cooling system" (viz., evaporative cooling system) has been proposed for achieving cooling of an internal combustion engine. This type of cooling system basically features an arrangement wherein a liquid coolant (for example, water or a mixture of water and antifreeze or the like) in the coolant jacket of the engine is permitted to boil and the gaseous coolant thus provided is passed out to an air-cooled heat exchanger or radiator where the gaseous coolant is cooled or liquefied and then recirculated back into the coolant jacket of the engine. Due to the effective heat exchange achieved between the gaseous coolant in the radiator and the atmosphere surrounding the radiator, the cooling system exhibits a very high performance.

As will become apparent hereinafter, some of such cooling systems are provided with a coolant level sensor for detecting the level of liquid coolant in the coolant jacket of the engine. With the signals from the sensor, the amount of the coolant in the coolant jacket is so controlled as to constantly cover the highly heated zones of the jacket under operation of the engine.

However, due to the bumping and frothing of the coolant which accompanies an inevitable vigorous boiling in such highly heated zones, the level detection by such level sensor is often erroneous thereby deteriorating the performance of the cooling system.

SUMMARY OF THE INVENTION

It is therefore an object of the present invention to provide an improved coolant level sensor arrangement for the above-mentioned boiling liquid cooling system, which arrangement assures exact coolant level detection by the sensor even in zones where vigorous boiling occurs.

According to the present invention, there is provided an improved coolant level sensor arrangement in a boiling liquid cooling system for an engine, in which the arrangement comprises means defining in the cylinder head a coolant jacket into which coolant is introduced in liquid state and from which the coolant is discharged in gaseous state, a separate chamber member detachably connected to the cylinder head, the chamber member having at least two ports which are mated with corresponding two ports formed in the cylinder head so that the interior of the chamber member is fluidly communicated with the coolant jacket of the cylinder head and that usually the chamber member contains therein liquid coolant by the same level as in the coolant jacket, and a level sensor mounted to the separate chamber member to detect the level of coolant contained in the chamber member.

BRIEF DESCRIPTION OF THE DRAWINGS

Other objects and advantages of the present invention will become apparent from the following description when taken in conjunction with the accompanying drawings, in which:

FIG. 3 is a side view of the part of the cylinder head of FIG. 2, which is taken from the direction of the arrows III—III of FIG. 2;

FIG. 4 is a plan view of a chamber member to which a coolant level sensor is mounted, the chamber member being attached to the side wall of the cylinder head;

FIG. 5 is a sectional view of another chamber member which is employed in a second embodiment of the present invention; and FIG. 6 is a plan view of the chamber member of FIG. 5.

DESCRIPTION OF BOILING LIQUID COOLING SYSTEM

Figure 1:
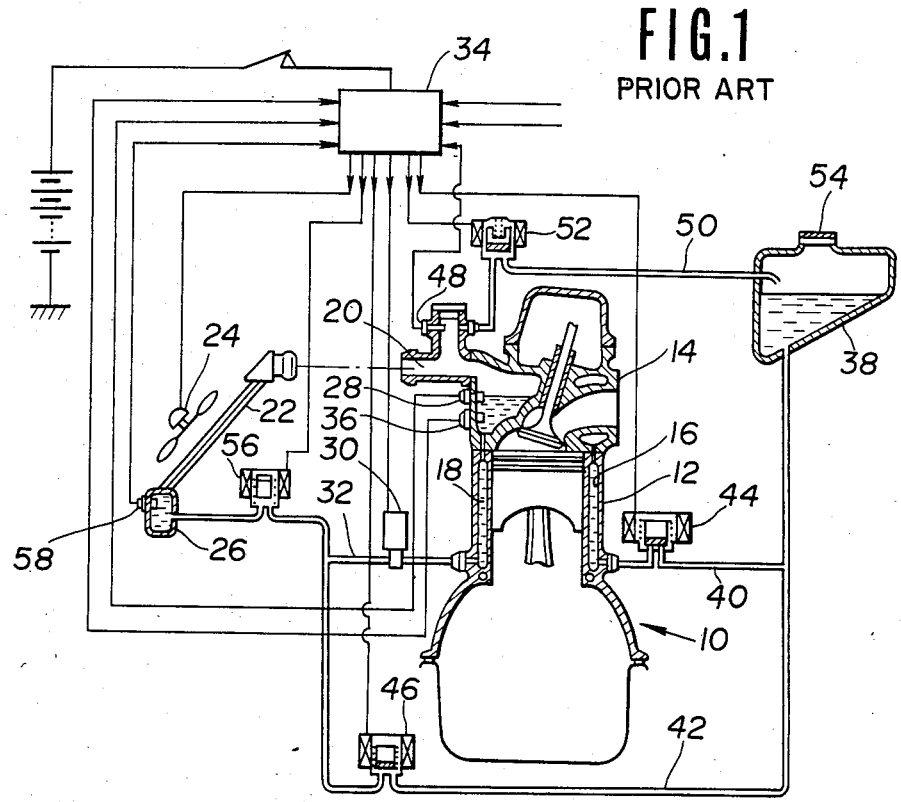
FIG. 1 is a schematical illustration of an exemplified boiling liquid cooling system which is practically applied to an internal combustion engine.

Prior to describing in detail the invention, an exemplified boiling liquid cooling system will be outlined with reference to FIG. 1 because the invention is closely associated with the cooling system as will become apparent as the description proceeds.

In FIG. 1, there is schematically shown the boiling liquid cooling system which is practically applied to an internal combustion engine, which is disclosed in prior filed U.S. patent application Ser. No. 663,911 filed Oct. 23, 1984 in the name of Yoshinori HIRANO. The engine is generally designated by reference 10 which includes a cylinder block 12 on which a cylinder head 14 is detachably mounted. The cylinder head 14 and the cylinder block 12 include suitable cavities which define a coolant jacket 16 about the heated portions of the cylinder head and block. Contained in the coolant jacket 16 is cooling liquid (coolant) 18 which, under normal operation of the system, sufficiently covers the walls of the combustion chambers while maintaining the upper portion of the coolant jacket 16 empty of the liquid coolant, as shown. The liquid coolant boils and evaporates when heated sufficiently by combustion heat of the engine, so that under operation of the engine, the upper portion of the jacket 16 is filled with coolant vapor.

Fluidly communicating with a vapor discharge port 20 of the cylinder head 14 is a radiator or heat exchanger 22. It is to be noted that the interior of this radiator 22 is maintained essentially empty of liquid coolant during normal engine operation so as to maximize the surface area available for condensing the coolant vapor (via heat exchange with the ambient atmosphere) and that the cooling system as a whole (viz., the system encompassed by the coolant jacket, radiator and conduting interconnecting the same) is hermetically closed when the engine is warmed-up and running. These will become clearer as the description proceeds.

Located adjacent the radiator 22 is an electrically driven fan 24 which, upon energization, produces air flow passing through the radiator 22 to promote the condensation function of the same. Defined at the bottom of the radiator 22 is a small collection reservoir or lower tank 26 into which the coolant liquefied by the radiator 22 pours.

Disposed in the coolant jacket 16 is a coolant level sensor 28 which detects whether the level of the liquid coolant in the coolant jacket 16 is at a predetermined level or not. That is, when, due to the continuous evaporation in the jacket 16, the level of the liquid coolant lowers to the predetermined level, the signal issued from the sensor 28 induces energization of an electrically driven pump 30 which is disposed in a return passage 32 which extends from the lower tank 26 of the radiator 22 to a lower portion of the coolant jacket 16 of the engine 10. Actually, the operation of the pump 30 is controlled by a control unit 34 as is clearly described in the afore-mentioned prior filed U.S. patent application. With this, the coolant level in the coolant 16 is kept substantially at the predetermined level during normal operation of the system.

A temperature sensor 36 is disposed also in the coolant jacket 16 in order to detect the temperature of the coolant therein. Receiving signals from the temperature sensor 36 and other sensors (not shown) such as, engine rotation speed sensor, acceleration pedal angle sensor and fuel supply rate sensor, the control unit 34 controls operation of the electric fan 24 in a manner to allow the engine proper 10 to have an optimum temperature in accordance with the operation mode thereof. Under operation of the cooling system, the cooling system as a whole is hermetically closed, so that changing the pressure in the system induces variation in the boiling point of the liquid coolant contained therein.

When, for example, the engine 10 is under low load condition wherein heat generated by the engine is relatively small, the control unit 34 controls the electric fan 24 to produce a less amount of air flow per unit time (in practice, the control unit 34 stops the fan 24) to lower the condensation function of the radiator 22. With this, the pressure in the system becomes higher than the atmospheric value thereby increasing the boiling point of the liquid coolant in the system to a certain value, so that the temperature of the coolant in the coolant jacket 16 can be kept at relatively high level (for example 120° C.) thereby achieving reduction in thermal loss of the engine 10.

When, on the contrary, the engine is under high load condition wherein heat generated by the engine is great, the control unit 34 controls the electric fan 24 to produce a greater amount of air flow per unit time (in practice, the control unit 34 continues energization of the electric fan 24) to promote the condensation function of the radiator 22. With this, the pressure in the system becomes lower than the atmospheric value thereby lowering the boiling point of the coolant in the system, so that the temperature of the coolant in the coolant jacket 16 can be kept at relatively low level (for example 90° C.) thereby achieving appropriate cooling of the engine.

Since the latent heat of the coolant 18 is considerably high and the heat radiation of the coolant vapor at the radiator 22 is sufficiently high, cooling of the engine 10 can be effectively achieved with a small amount of liquid coolant. Furthermore, by the reasons as mentioned hereinabove, the temperature control of the engine 10 can be effected in accordance with the operation modes of the engine with quick response.

In order to deal with undesirable negative pressure in the system which might occur when, after stop of the engine, the temperature of the liquid coolant lowers to the atmospheric value (for example 20° C. to 30° C.), the following measure is employed. (Actually, lowering of the coolant temperature promotes liquefaction of the coolant vapor in the system and thus the pressure therein is reduced considerably).

A reservoir tank 38 is provided which is fluidly communicated with the coolant jacket 16 of the engine 10 through conduits 40 and 42. Electromagnetic valves 44 and 46 are disposed in the conduits 40 and 42, respectively. The control unit 34 functions so that, upon stopping of the engine 10, it opens the valve 44 thereby forcing the additional liquid coolant in the reservoir tank 38 to flow down to the coolant jacket 16 by the force produced by the pressure difference between the interior of the system and the atmosphere. This coolant supply is continued until the level of the coolant in the jacket 16 rises to the level of another coolant level sensor 48 which is disposed in a riser-like portion (no numeral) of the cylinder head 14, as shown. With this, the negative-pressure in the system disappears.

In order to deal with undesirable air-contamination in the system which might occur when, due to lowering in pressure in the system, atmospheric air invades the coolant jacket 16 of the engine 10, the following measure is also employed.

A conduit 50 extends from the riser-like portion of the cylinder head 14 to the reservoir tank 38 and an electromagnetic valve 52 is disposed in the conduit 50. The control unit 34 functions so that upon starting of the engine 10, it opens the valves 52 and 46 and energizes the pump 30 thereby forcing the additional liquid coolant in the reservoir tank 38 to flow into the coolant jacket 16 until the level of the liquid coolant comes to the level of the level sensor 48. During this operation, the contaminating air in the coolant jacket 16 is driven to the reservoir tank 38 through the conduit 50 and discharged into the atmosphere through an air permeable cap 54 of the reservoir tank 38. During this, the valve 44 and another electromagnetic valve 56 which is disposed in the conduit 32 are both closed.

When, with the contaminating air thus discharged, the temperature of the liquid coolant in the coolant jacket 16 increases to a certain degree after start of the engine 10, the coolant in the jacket 16 starts boiling. Upon this, the valve 44 in the conduit 40 becomes opened by the information signals from the liquid level sensor 28 and another liquid level sensor 58 which is mounted to the lower tank 26 of the radiator 22, so that the coolant in the jacket 16 is obliged to boil under atmospheric pressure causing the coolant in the jacket 16, by the amount corresponding to that additionally fed to the jacket 16 from the reservoir tank 38 for the air purging, to return back to the reservoir tank 38. This coolant return operation is mainly carried out by the pressure produced in the vapor space of the coolant jacket 16.

As is clearly described in the afore-mentioned prior filed U.S. application, the pump 30 is controlled by the level sensor 28 so as to keep the level of the liquid coolant in the coolant jacket 16 at the predetermined degree. When, however, the liquid coolant level in the lower tank 26 of the radiator 22 lowers to the level determined by the level sensor 58 mounted thereto, operation of the pump 30 stops irrespective of natures of the signals issued from the level sensor 28 of the coolant jacket 16.

With the arrangement and operation described hereinabove, the boiling liquid cooling system can exhibit its excellent cooling performance over every operation mode of the engine 10. Since the cooling work of the system can be effected with a small amount of liquid coolant, the sizes or capacities of the coolant jacket 16, the radiator 22 and the electric pump 30 can be reduced, which induces "small-sized and light-weight" construction of the cooling system. Furthermore, warm up of the engine 10 can be effected in a shortened time and, due to the excellent heat exchange carried out at the radiator 22, operation of the electric fan 24 can be economized (that is, the time for which the fan 24 operates practically can be reduced).

DRAWBACKS ENCOUNTERED IN THE PRIOR PROPOSED COOLING SYSTEM

However, the boiling liquid cooling system as mentioned hereinabove has the following drawback originating from the arrangement of the level sensor 28 the detector portion of which is exposed to the interior of the coolant jacket 16. That is, in the system, the detector portion of the level sensor 28 is positioned close the zones where, under operation of the engine 10, bumping and frothing of the coolant occur violently. Thus, the level detection by such level sensor 28 is often erroneous due to the deluge of waves, foam and rain-like precipation of coolant droplets.

Furthermore, due to the inherent construction of the cylinder head 14, it is impossible to use inexpensive "float type" level sensors as the level sensor 28. In practice, "semiconductor type" and/or "electrostatic type" level sensors which are expensive have been hitherto used for such level sensor 28.

DETAILED DESCRIPTION OF THE INVENTION

It is therefore an essential object of the present invention to provide the above-mentioned boiling liquid cooling system with an improved level sensor arrangement which is free of the above-mentioned drawbacks.

Figure 2:
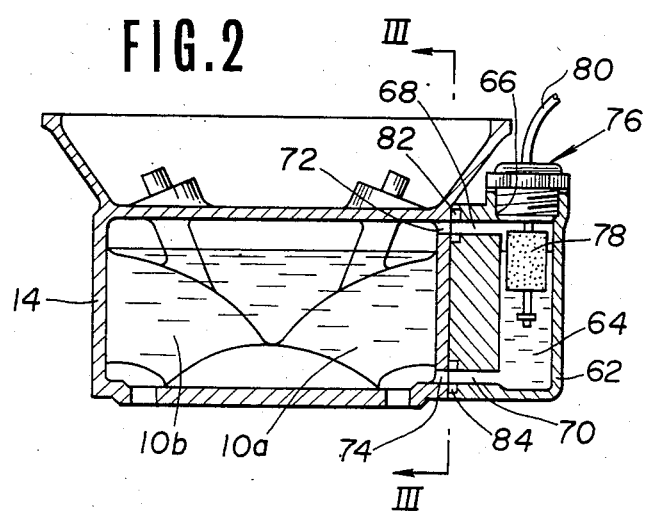
FIG. 2 is an enlarged sectional view showing a part of a cylinder head of the engine of FIG. 1 to which a first embodiment of the present invention is applied.

Referring to FIGS. 2 to 4, there is shown a first embodiment of the present invention which is practically applied to a cylinder head 14 of an internal combustion engine 10. Designated by numerals 10a and 10b in FIG. 2 are intake and exhaust ports or vice versa of the engine. As is best seen from FIG. 3, one side of the cylinder head 14 is formed with a vertically elongated platform 60 onto which a generally rectangular chamber member 62 is sealingly mounted. For this mounting, the chamber member 62 has two brackets 62a and 62b (see FIG. 4) which are bolted to corresponding threaded holes 14a and 14b (see FIG. 3) formed in the cylinder head 14. As is seen from FIG. 2, the chamber member 62 has a rectangular cavity 64 formed therein, which cavity is merged with a sensor mounting threaded bore 66 which is formed in a raised portion of the member 62. The chamber member 62 is formed with upper and lower parallel passages 68 and 70 which are mated with upper and lower openings 72 and 74 formed in the side wall of the cylinder head 14. With this, the cavity of the chamber member 62 is fluidly communicated with the coolant jacket 16 of the cylinder head 14, so that usually the cavity 64 contains therein the liquid coolant by the same level as that in the coolant jacket 16. It is preferable to locate the upper opening 72 of the cylinder head 14 at the uppermost zone of the cylinder head 14 for the reason which will become apparent as the description proceeds. A float-type level sensor 76 is threadedly and sealingly disposed in the mounting bore 66 of the chamber member 62, having a float 78 thereof operatively or buoyantly put in the cavity 64. Two lead wires 80 extend from the sensor 76 to the control unit 34 (see FIG. 1). Designated by numerals 82 and 84 are O-rings, each assuring sealing of the associated portion. It is not desirable to use a heat insulating material, such as a gasket, for sealing the portion, because, when using the heat insulating material, heat transfer from the cylinder head 14 to the chamber member 62 is deteriorated.

In this embodiment, due to the location of the level sensor 76 within the chamber member 62 which is located away from the so-called "hot zone", the detector portion of the sensor 76 is shielded from the wave-like movement and foaming of the coolant produced by the boiling action of the coolant and from rain drop-like precipitation of coolant which falls from the upper walls of the cylinder head structure. Furthermore, since the chamber member 62 is substantially directly connected to the cylinder head 14, the heat transfer from the cylinder head 14 to the chamber member 62 is quickly and effectively achieved. Thus, undesirable liquefaction of vapor coolant in the upper passage 68 of the chamber member 62 is not caused or at least minimized. Accordingly, the real level of the liquid coolant 18 in the coolant jacket 16 of the cylinder head 14 can be measured with accuracy by the level sensor 76. Furthermore, in this embodiment, due to increased freedom in sensor mounting position, the inexpensive float-type level sensor can be used. Furthermore, since the upper passage 68 of the chamber member 62 is open to the uppermost zone of the coolant jacket 16 of the cylinder head 14, filling the jacket 16 with liquid coolant, which takes place when the engine 10 is under standstill, does not cause formation of vapor space in the cavity 64 of the chamber member 62.

Referring to FIGS. 5 and 6, there is shown a second embodiment of the present invention which is identical to the first embodiment except for a window 85 provided to the chamber member 62'. The member 62', for this, has at its back side a circular opening 87. A transparent glass pane 86 or the like and a suitable frame 88 are attached in this order to the body of the member 62 to sealingly cover the opening 87. The frame 88 is bolted to the member 62 at 90. A suitable seal means is used for achieving sealing at the window 85. With the window 85, the movement of the float 78 of the sensor 76 can be visually observed from the outside.

What is claimed is:

1. A boiling liquid cooling system for an engine having a cylinder head, comprising:
   a coolant jacket in said cylinder head into which coolant is introduced in a liquid state and from which coolant is discharged in a gaseous state;
   means for condensing the gaseous coolant from said coolant jacket into condensed liquid coolant;
   a pump for pumping said condensing liquid coolant into the coolant jacket of the cylinder head when energized;
   a separate chamber member directly connected to said cylinder head, said chamber member having two ports respectively connected with two ports formed in said cylinder head, the interior of said chamber member thereby being in fluid communication with the coolant jacket of the cylinder head so as to be in heat transfer communication with said cylinder head, said chamber member containing therein liquid coolant at substantially the same level as in said coolant jacket, said chamber member thereby providing means for isolating the liquid coolant therein from transient liquid level variations in said jacket due to boiling of said liquid coolant in said jacket; and a level sensor mounted in said separate chamber member to detect the level of liquid coolant in the chamber member and thereby to control operation of said pump in accordance with the level.

2. A system as recited in claim 1 in which said chamber member is formed with a threaded bore in which said level sensor is threadedly disposed.

3. A system as recited in claim 1 wherein said pump is electric, and wherein said level sensor is of a float-type.

4. A system as recited in claim 1 in which said chamber member is bolted to an elongated platform portion formed on said cylinder head.

5. A system as recited in claim 1 in which one of said two ports of said cylinder head is located in the upper most zone of the coolant jacket of said cylinder head.

6. A system as recited in claim 1 in which said separate chamber member is formed with a window through which the interior of said member is visually observable from the outside.

* * * * *